United States Patent Office 3,206,422
Patented Sept. 14, 1965

3,206,422
PROCESS FOR THE POLYMERIZATION OF UNSATURATED MONOMERIC ORGANIC COMPOUNDS IN AQUEOUS EMULSIONS
Werner Kern, Rolf Schulz, and Harald Cherdron, Mainz, Germany, assignors to Deutsche Gold- und Silber-Scheideanstalt vormals Roessler, Frankfurt am Main, Germany
No Drawing. Filed Apr. 11, 1960, Ser. No. 21,085
Claims priority, application Germany, Feb. 5, 1958, D 27,358; Apr. 10, 1959, D 30,395
7 Claims. (Cl. 260—29.6)

The present invention is a continuation-in-part application of U.S. application Serial No. 790,387, filed February 2, 1959, now abandoned.

The present invention relates to a novel process for the relatively rapid polymerization of unsaturated monomeric organic compounds in aqueous solutions.

The object of the present invention is to provide a relatively simple polymerization process designed to be applicable to the polymerization of a variety of monomeric unsaturated organic compounds into macromolecular sized polymers.

Another object of this invention is to provide a novel emulsifying agent with which it is possible to polymerize a number of monomeric unsaturated organic compounds into macromolecular polymers.

A further object of this invention is to provide a practical emulsion polymerization process which will allow the use of a redox system as the polymerization initiator.

It is known that synthetic or natural polymeric materials, which are soluble in water can be used as protective colloids or emulsifying agents in emulsion or suspension polymerization techniques. Examples of such polymeric materials are polyethylene oxide, partially or completely saponified polyvinyl acetate, polymers or copolymers of acrylic acid, water soluble cellulose derivatives, alginates, and so forth. The presence of hydroxyl and/or carboxyl groups is common to all these materials. A further example of this type of emulsifying agent is polymethyl propanol-sodium-methacrylate, which can be obtained by a disproportionation reaction of polymethacrolein.

It has now been unexpectedly discovered, according to the present invention that a polymeric emulsifying agent of another type can be obtained by dissolving polyacrolein in aqueous solutions of sulfurous acid, whereby polymeric α-hydroxy-sulfonic acids are formed. These groupings are responsible for the emulsifying action. This emulsifying agent can be used, according to this invention, for the emulsion polymerization of a number of unsaturated organic monomers, including for example, acrolein, alpha substituted derivatives of acrolein, acrylic nitrile, acrylic acid esters, styrene, isoprene, chloroprene, and the like, all of which are characterized by containing a $CH_2=C<$ group in their chemical structure. By alpha substituted derivatives of acrolein it is meant, in particular, alpha methyl or alpha ethyl acrolein. Preferably, however, this invention favors the use of non-substituted acroleins in this regard. Furthermore, in the process of this invention, the presence of free sulfurous acid is not necessary.

As is well known, the art of emulsion polymerization, in many cases, offers substantial advantages over polymerizations conducted in a solution or in situ. When knowledge and techniques learned in the making of other polymers were applied to the emulsion polymerization of acrolein, it was found that customary emulsifiers, for example, sodium oleate or other soaps, while producing stable oil-in-water emulsions of the acrolein monomer, cause flocculation of the resulting polymers, particularly so in the case where a reduction-oxidation (redox) system is used as the polymerization initiator. It would appear then from a study of the course of these type polymerization reactions and of the molecular weights of the polymers thereby obtained that a practical emulsion polymerization process, using a redox system as the polymerization initiator, could not be devised.

At 20° C., water dissolves 20.85 volume percent of monomeric acrolein. In comparison to this, a polyacrolein-sulfurous acid solution dissolves about 30% of the monomer and with an excess of acrolein a stable emulsion is formed. When a suitable redox system is then used as the polymerization initiator in this emulsion (polymerization technique), the resulting polymer does not flake or flock out of the emulsion as is the case when other emulsifiers are used.

It is to be pointed out that the process according to this invention has the particular advantage in that under these conditions the polymerization takes place much faster than would be the case were it conducted in an aqueous solution or in an aqueous suspension. The polyacroleins produced according to this invention have molecular weights which are considerably higher than those of the polymers produced under otherwise similar conditions in solution or suspension type polymerizations.

These increases in the speed of the polymerization reaction, as well as in the molecular weights of the polymers obtained, have not been attainable using the emulsion polymerization processes known to date. The following table compares the results of the polymerization processes as applied to acrolein achieved both by the process according to this invention as well as by the other known processes. This table shows the overall polymerization speed and $\eta_{sp/c}$ values (measured in sulfurous acid) for polyacroleins which were produced in solution and in an emulsion using a potassium persulfate-silver nitrate redox system as the polymerization initiator.

| Polymerization in aqueous medium | Acrolein content in percent | Overall speed $\frac{\Delta M}{\Delta t}$ | $\eta_{sp/c} 10^2$ |
|---|---|---|---|
| Acrolein in solution | 20 | 0.138 | 1.98 |
| Acrolein in suspension (without emulsifier) | 50 | 0.372 | 4.73 |
| Acrolein in emulsion with: | | | |
| (a) Sodium oleate | 50 | 0.194 | 6.72 |
| (b) Condensation product of alkylphenol with ethylene oxide | 50 | 0.241 | 6.23 |
| (c) Sodium alkylsulfonic acid | 50 | 0.127 | 6.97 |
| (d) Aqueous polyacrolein-sulfurous acid solution | 50 | 0.770 | 11.15 |

In addition, it has been further found that particularly good results can be obtained if a redox system is used as the catalyst in the process according to the invention. This is possible under the process of this invention since the addition of the emulsifying agent will tend to put the pH of the reaction mixture within a range more favorable for redox polymerizations. Such redox systems include those comprised of, on the one hand, hydrogen peroxide, an organic hydrogen peroxide which is at least partially soluble in water (such as, for example, tertiary butyl hydrogen peroxide) or sodium, potassium or ammonium persulfate, and on the other hand iron-II, silver-I or titanium-III salts. A small amount of the catalyst is used in the polymerization, for example, less than 0.05 mol of catalyst for each mol of acrolein to be polymerized.

As a rule, the solutions of the polyacroleins in aqueous sulfurous acid which are to be used as emulsifiers are dilute. It is of special advantage in this regard if the emulsion is so formulated that for every 100 parts of emulsion there are 0.2 to 2 parts of polyacrolein-sulfurous acid compound as emulsifier. However, higher concentrations of the emulsifying agent can also be used with advantage. For example, when the emulsifying solutions contain 2 to 5 parts of the polyacrolein-sulfurous acid compound per 100 parts of the aqueous phase, then the latex of the polymers produced can be very extensively diluted with water, without thereby causing the polymers to separate out in flakes or flocks. There can also be used, to good advantage, as such an emulsifier a solution of polyacrolein which has been dissolved, under pressure, in an aqueous sulfur dioxide solution containing an excess of sulfur dioxide. Aqueous solutions of bisulfite, such as sodium bisulfite, can also be used instead of the sulfurous acid solutions.

The process of this invention can be expediently conducted at temperatures of 0° to 100° C. However, since the polymerization conducted according to this invention proceeds so swiftly, it can often be conducted at room temperature or even at lower temperatures. In order to achieve an efficient process provision should be made for the effective removal of the exothermic heat of the reaction.

It is expedient to conduct the polymerization of acrolein according to this invention in the absence of oxygen. In many cases, the presence of oxygen during the course of the polymerization will unfavorably influence both the course of the reaction as well as the properties of the polyacroleins.

A number of variations of the process according to this invention are possible. It is possible, for example, to conduct the polymerization in the presence of stabilizers, pigments or other known emulsifiers.

The polyacroleins produced by the process according to this invention, depending upon the conditions employed, have molecular weights which lie between 50,000 and 300,000, and even higher in some cases. These acrolein polymerizates also contain a high portion of reactable aldehyde groups, as a rule, at least 65% of the theoretical figure.

The polyacroleins can be used as is or they, for example, can be reacted further, as described in German patent applications D 20,095 and D 22,164, to form polyacrolein derivatives. These are useful in the production of films, coatings and lacquers for use in the surface treatment of textiles and leather goods. Due to the great chemical reactivity of the aldehyde groups these polyacroleins or their derivaives can also be used in the aftertreating, cross-linking or hardening of other polymers or they can be used as chemically active admixing materials.

EXAMPLE 1

(a) *Preparation of the emulsifier solution*

10 g. of polyacrolein (formed in an aqueous solution by a redox polymerization) was dissolved in 200 ml. of a 10% solution of sulfur dioxide in water (d.=1.0493). The excess sulfur dioxide was removed by dialysis and the solution was diluted to 500 ml. The amount of $SO_2$ removed corresponds to about the quantity which was not chemically linked to the polymer.

(b) *Emulsion polymerization*

0.91 g. of potassium persulfate was dissolved in 40 ml. of distilled water at 20° C. in a reaction vessel which had a nitrogen atmosphere. 50 ml. of the emulsifying solution, prepared as outlined above, were introduced into the reaction vessel and the vessel was agitated for three minutes. Then 50 ml. of unstabilized monomeric acrolein was added and this entire mixture was strongly agitated for 10 minutes more. 0.57 g. of silver nitrate in 10 ml. of water was quickly added dropwise. After a short time the polymerization began and the emulsion began to become viscous. By means of external cooling the reaction temperature was maintained at 20° C. After 45 minutes the reaction mixture was diluted with 300–400 ml. of water, which caused the polymer to flock out. The polymer was separated from the mixture by suction, washed four times with water and dried in a vacuum at room temperature.

The yield 29 g. of polyacrolein (71% of the theoretical); the aldehyde groups of the polymers were 71% of the theoretical; and the molecular weight was 125,000 which was determined viscosimetrically according to an osmotically ascertained standard curve.

EXAMPLE 2

0.45g. of potassium persulfate were dissolved in 40 ml. of distilled water at 20° C. To this solution then, 10 ml. of the emulsifying agent produced above (1a) and 20 ml. of unstabilized acrylonitrile were added and vigorously stirred for 10 minutes. Thereafter, in rapid sequence, 0.28 g. of silver nitrite dissolved in 10 ml. of water was added dropwise. By the utilization of good heat exchange means to remove the exothermic reaction heat it was possible to have the polymerization reaction, which set in at once, to proceed at 20° C. After 60 minutes the reaction mixture was diluted with 300 ml. of water and the polymer, which had flocked out, was suction filtered, washed several times with water and then dried at room temperature in a vacuum. Yield 12 g. (75% of the theoretical).

EXAMPLE 3

20 ml. of acrylic acid methyl ester were emulsified, as in Example 2, in 35 ml. of water with 15 ml. of the emulsifying agent produced in Example 1a. To this emulsion, in which there had also been dissolved 0.45 g. of potassium persulfate, a solution of 0.28 g. of silver nitrate dissolved in 10 ml. of water was added dropwise. The reaction was allowed to proceed at 20° C. for 60 minutes with the aid of very good heat exchange means and then the polymer was precipitated out by the addition of a concentrated solution of aluminum sulfate. The polymer was recovered, washed and dried as in Example 2. 18 g. of the polymer were thereby produced which constituted a yield of 95%.

EXAMPLE 4

30 ml. of the emulsifying agent produced in Example 1a and 10 ml. of chloroprene were added to 20 ml. of water at 40° C. An emulsion was then formed by stirring this mixture for 10 minutes. 0.4 ml. of hydrogen peroxide (30%) were then added to this emulsion and the polymerization reaction, which initiated slowly, was allowed to proceed at 40° C. for one hour. The polymer was precipitated out from the somewhat viscous, resulting latex with a saturated solution of aluminum sulfate. Yield 8.3 g. (87% of the theoretical).

EXAMPLE 5

0.9 g. potassium persulfate were dissolved in 30 ml. of distilled water at a temperature of 20° C., the reaction vessel being under an atmosphere of nitrogen. To this were added 60 ml. of the emulsifying agent made as in Example 1 (adding water to a total volume of 250 ml.). 50 ml. of unstabilized vinyl acetate were then emulsified in this mixture. The polymerization reaction set in at once. The vessel was cooled in order to dissipate the heat of reaction. After 40 minutes the polymerization reaction had come to an end. The stable emulsion of the polymer did not flock out on diluting with water. The polymer may be obtained as a solid on addition of aluminum sulfate; the yield of the solid polymer is 92%.

We claim:

1. In the emulsion polymerization of a monomeric unsaturated organic compound selected from the group consisting of acrolein, methacrolein, acrylonitrile, acrylic acid esters, styrene, isoprene, chloroprene and vinyl acetate in an aqueous medium, the steps of initiating and carrying out said emulsion polymerization with an emulsion of said monomeric unsaturated organic compound in an aqueous medium containing 0.2 to 5 parts by weight of a polyacrolein sulfurous acid compound per 100 parts of aqueous phase dissolved therein as essentially the sole emulsifying agent for said monomer, said polyacrolein sulfurous acid compound being in the form of a polymeric $\alpha$-hydroxy sulfonic acid.

2. An aqueous emulsion of polyacrolein produced by the process of claim 1.

3. A process as in claim 1 in which said solution contains an excess of sulfur dioxide.

4. A process as in claim 1 in which said polymerization is carried out in the presence of a catalytically effective amount of a redox system as a polymerization catalyst, said redox system consisting of an oxidizing agent selected from the group consisting of hydrogen peroxide, partially water soluble organic hyrdoperoxides, sodium persulfate, potassium persulfate and ammonium persulfate and a reducing agent selected from the group consisting of iron-II salts, silver-I salts and titanium-III salts.

5. A process as in claim 4 in which the quantity of said catalyst is less than 0.05 mol of the said catalyst is used for each mol of the said monomer.

6. A process as in claim 4 in which the polymerization is conducted at a temperature between 0 and 100° C. room temperature.

7. A process as in claim 4 in which the polymerization is conducted in an absence of elemental oxygen.

References Cited by the Examiner

UNITED STATES PATENTS

| | | | |
|---|---|---|---|
| 2,559,749 | 7/51 | Benning | 260—67 |
| 2,580,315 | 12/51 | Park | 260—67 |
| 3,036,978 | 5/62 | Kern et al. | 260—73 |
| 3,068,203 | 12/62 | Schweitzer | 260—67 |

OTHER REFERENCES

Schildknecht: Vinyl and Related Polymers, John Wiley & Sons, Inc., New York, 1952, page 700 relied upon.

WILLIAM H. SHORT, *Primary Examiner*.

MILTON STERMAN, H. N. BURSTEIN, *Examiners*.